UNITED STATES PATENT OFFICE.

MAXWELL O. JOHNSON, OF WAIPIO, TERRITORY OF HAWAII.

PROCESS OF MAKING JELLY.

1,362,869.   Specification of Letters Patent.   Patented Dec. 21, 1920.

No Drawing.   Application filed September 12, 1919.   Serial No. 323,235.

*To all whom it may concern:*

Be it known that I, MAXWELL O. JOHNSON, a citizen of the United States, residing at Waipio, in the county of Honolulu, Territory of Hawaii, have invented certain new and useful Improvements in Processes of Making Jelly, of which the following is a specification.

The invention relates to fruit jelly as an article of commerce, and in certain of its features, the invention relates to a process of making jelly.

Objects and advantages of the invention will be set forth in part hereinafter, and in part will be obvious herefrom, or may be learned by practice with the invention.

The invention consists in the novel steps, processes and articles herein described and set forth.

In the usual process of making fruit jellies, the fruit is subjected to protracted boiling with water, the juice then being strained out from the boiled mass through a cloth. Sugar is added to the strained-out juice, which is then boiled down or concentrated until it will "set" or "jell" on cooling.

Nearly all known processes of jelly-making involve an extensive application of heat to the fruit juices and many of them require long-continued evaporation at a high temperature. The application of heat, especially at high temperature and for a considerable time, very seriously impairs, or even destroys, the natural and desirable fruit flavor, this being due, very probably, to the evaporation or destruction of certain essential or other organic combinations, which impart their characteristic flavors to the respective fruits.

In any event, the jellies formed by evaporating the fruit juices do not usually possess a flavor very similar to that of the fresh fruit. By my invention, the extensive application of heat is avoided, a simple and economical process of making the jelly is provided, and the natural and desirable flavor of the fruit is preserved and perpetuated in the jelly.

In the preferred practice of the invention, the juice is extracted from the fruit cold, or at normal temperature, and for this purpose any suitable means, such as a fruit press, may be employed. With some fruits, such as do not press readily cold, that is, which do not yield their juice completely or satisfactorily at normal temperature; or where the yield of pectin may be thereby increased, it may be found advisable in such cases to heat the fruit either with or without the addition of water, and thereafter extract the juice. In all cases, the long continued application of relatively high temperatures is to be avoided.

The extracted juice is concentrated in a suitable manner, with the avoidance of the destructive or harmful high temperatures and continued heat application referred to.

According to one feature of the invention, the juice for manufacturing the jelly is concentrated by freezing. By this process the water, or equivalent aqueous component, in the fruit juice gradually separates out as ice, and the sugars, acids and flavoring matters are concentrated in the unfrozen liquid. The concentrated fruit juice and ice are then separated in a suitable manner, as by centrifugal action. The degree of concentration of the juice will depend upon the amount of freezing which takes place, that is, to what degree the water in the juice is separated therefrom by freezing. This in turn will depend in part upon the time or duration of the freezing, and also somewhat on the temperature of the brine or other freezing liquid. Fruit juices may be concentrated to five or six times the concentration of the original or extracted juice, if desired.

In actual practice, the juice concentration may be effected in an ice machine, and to effect economy, the juice may be preliminarily cooled, by passing it through coils which are cooled by the cold brine or other freezing liquid. Also, the ice separated from the previously concentrated juice may be employed for this purpose. This shortens the succeeding freezing operation, and effects a useful and desirable economy.

The juice is placed in the can or cans of the freezing machine and the juice freezes from the sides and bottom of the can inwardly. With relatively lower or lesser concentrations of the juice, there is left in the ice a central cavity containing a large proportion of the concentrated juice, and in emptying the can, it is advisable to drain off as much as possible of this free concentrated juice.

The ice block is then run into an ice breaking machine, and usually considerable additional concentrated juice can be drained off at this point. The broken ice is then preferably placed in a centrifugal separating machine and the remainder of the concentrated juice, much of which is adherent on the ice fragments, is separated from the ice. If a higher concentration of juice is desired, the process of concentration substantially as described may be repeated.

In applying the process so far as described, by way of example, to making jelly from pineapple juice, it has been found expedient to concentrate the juice to about two or three times its original strength. This degree of concentration is usually obtained, when using 300 pound cans, in from 36 to 48 hours. The temperature of the circulating brine will also be a factor in the length of time required. With cans of different sizes the time required would also vary. It will be understood that these and later details given of the application of the process to making pineapple jelly are explanatory and exemplary and are not restrictive of the invention broadly.

The degree to which concentration of the juice will be carried will depend to a large extent on the fruit juice used and on the richness of flavor desired in the final product. With pineapple juice, I prefer at present to concentrate the juice to about twice its original strength to constitute a base in making the jelly.

In accordance with one feature of the invention, with such fruits and in such cases as may be necessary or desirable, to reduce objectionable acidity while producing a desired concentration of juice, the acid in the juice may be neutralized by lime, or otherwise, leaving that degree of acidity in the juice which will give the best result in the final product. By this feature, the relative proportions of acid and of natural sugar in the juice are varied, regulated and controlled while attaining the most efficient or economical, or otherwise desired, degree of concentration of the juice. If for instance the juice be cheap, in order to save sugar the juice may be concentrated to a point where the acidity is too high for good flavor. The acidity can then be partially neutralized by liming to the proper point. This highly concentrated juice will then require the addition of but little sugar for a jelly. On the other hand, if the juice or process of concentration be very expensive, the juice may be concentrated only a little by the process, and acids such as citric or tartaric added to increase the acidity to the desired point.

It is frequently desirable to clarify the fruit juice, especially where a clear appearance in the jelly is desirable or advantageous. In the case of pineapple juice, the concentrated juice is of a brown color, is cloudy and to a certain degree viscous. With certain juices, they can be practicably clarified by filtration, but with cold concentrated juices this is usually a very tedious process.

I prefer at present to clarify the concentrated juice by adding diatomaceous earth, heating somewhat, settling and filtering. The diatomaceous earth, such as keiselguhr, silicious earth or filter cel, is not essential, but aids greatly in the work of filtration. In the heating referred to, especially in the case of pineapple juice, soft particles are formed by coagulation of the proteids, and these tend to clog the filters unless some filtration aid is employed. It is also preferable that the juice be heated to a slightly higher temperature during clarification than in the subsequent sterilization, thereby avoiding further or additional coagulation of proteids, which would tend to cloud the juice or jelly. Other filtration aids may be employed, such as kaolin, Spanish clay, casein, egg albumin, etc. The filtration aid may be added to the juice before or after heating.

To clarify the juice and to promote rapid filtration, the juice is preferably heated. This heating is relatively brief and at a temperature such as to avoid the detrimental effects upon the flavor and other desirable properties which are produced by boiling the fruit in the ordinary process of jelly making. With most juices temperatures below boiling, especially for relatively brief periods, have no appreciable detrimental effect on the flavor. Such heating in the case of pineapple juice may be 140° F. or somewhat higher if desired.

The juice is preferably settled, although this may be dispensed with, especially when the manner of filtering described is followed. The settling may be done in tanks in the usual manner, and the clear liquid may be siphoned off. The settling and filtration will be coördinated as found best in practice, and it may be practicable in many cases to dispense with either one or the other. The filtration when employed may be done with any suitable filtration device. With pineapple juice, I have found it satisfactory to employ the commercially known Kiefer filters with paper pads.

Certain fruits contain insufficient proportions or quantities of pectin to cause jellification of the concentrated juice. Some fruits appear to be practically entirely lacking in this material. The pineapple already referred to is an example of such a fruit. If such fruit juices be concentrated, with or without the addition of sugar, only a syrup is obtained, and there is no jellying.

By the addition of pectin, which may be obtained from such fruits as apple, guava, grape, etc., to pineapple juice, or other fruit juices of like character, with the addition of sugar, they will then jellify, and a jelly is produced similar in consistency to other fruit juice jellies.

The amount of sugar and pectin to be added to the concentrated and preferably clarified juice depends on the degree of concentration of the fruit juice. The greater the degree of concentration of the fruit juice, the more sugar the juice will contain, and the less relatively the amount of sugar it will be necessary to add. As already indicated, where the original fruit juice contains pectin, it may be necessary to add none or but little of this substance to the concentrated juice. The pectin may be added dry or in solution, but better incorporation thereof in the juice is effected by adding the pectin in solution.

I have found in practice that the amount of sugar to be added to the concentrated fruit juice should be such that the concentration of total sugars in the final product is between fifty and eighty per cent., and the amount of pectin between two tenths of one per cent. and ten per cent. Also as a guide to the degree to which the concentration of the juice should be carried, the amount of acid in the final product which produces the best or most relishable flavor is between two tenth of one per cent. and five per cent. For pineapple juice, I prefer as at present advised, in the final product a concentration of about sixty-five per cent. of sugar, about one per cent. of pectin and about one per cent. of acid. It will be understood that the proportions and percentages stated are exemplary and explanatory and are not restrictive of the invention.

If a product similar to a marmalade is desired, in which pieces of the fruit are suspended in the jelly, these pieces may be added at any stage in the process.

The concentrated juice and sugar, and pectin when required, are raised to a temperature sufficient to effect sterilization. This will vary somewhat with different fruit juices, and if pieces of fruit are added, the temperature required will, of course, be higher. With pineapple juice, heating to a temperature of 180 or 200 degrees Fahrenheit will sterilize the product. The flavors of the product prepared from fruit juices concentrated by freezing are highly resistant to heat, and this product may be heated to or maintained at a boiling temperature for a short time without impairment. After sterilization, the product is placed in suitable sterile containers and sealed.

It will be understood that changes may be made, within the scope of the appended claims, from the present preferred form or manner of practising the invention herein described without departing from the principles of the invention and without sacrificing its chief advantages.

What I claim is:—

1. The process of making fruit jelly while preserving the natural aroma and delicate flavor of the fruit, which comprises concentrating the fruit juice by freezing a part of the water content thereof, clarifying the juice by heating to a degree sufficient to cause a clouding or coagulation of suspended coagulable substances therein but insufficient to impair the flavor thereof, clearing the coagulated matter from the concentrated juice, adding sugar to the clear unboiled and concentrated juice, and jellifying the mixture.

2. The process of making fruit jelly while preserving the natural aroma and delicate flavor of the fruit which comprises concentrating the fruit juice by freezing a part of the water content thereof, thereby concentrating all the natural sugars, acids and flavoring matters of the juice in the concentrated juice residue, adding sugar, and jellifying the mixture.

3. The process of making fruit jelly while preserving the natural aroma and delicate flavor of the fruit which comprises concentrating the fruit juice by freezing a part of the water content thereof, thereby concentrating all the natural sugars, acids and flavoring matters of the juice in the concentrated juice residue, repeating the freezing operation when necessary to obtain a desired degree of concentration, adding sugar, and jellifying the mixture.

4. The process of making fruit jelly while preserving the natural aroma and delicate flavor of the fruit which comprises concentrating the fruit juice by freezing a part of the water content thereof, thereby concentrating all the natural sugars, acids and flavoring matters of the juice in the concentrated juice residue, controlling the acid content of the concentrated juice as desired without affecting the natural sugars and flavoring matters, adding sugar, and jellifying the mixture.

5. The process of making fruit jelly while preserving the natural aroma and delicate flavor of the fruit which comprises concentrating the fruit juice by freezing a part of the water content thereof, thereby concentrating all the natural sugars, acids, and flavoring matters of the juice in the concentrated juice residue, adding sugar to the concentrated juice until the total sugar content including the natural sugars is between fifty and eighty per cent., and jellifying the mixture.

6. The process of making fruit jelly while preserving the natural aroma and delicate flavor of the fruit which comprises concentrating the fruit juice by freezing a part of the water content thereof, thereby concentrating all the natural sugars, acids, and flavoring matters of the juice in the concentrated juice residue, adding sugar to the concentrated juice until the total sugar content including the natural sugars is between fifty and eighty per cent., adding between two-tenths and ten per cent. of pectin to jellify the mixture.

7. As an article of manufacture, fruit jelly comprising unboiled, cold concentrated fruit juice containing all the sugars and flavoring matters of the original juice, and sugar and pectin, wherein the concentration of total sugars in the final product is between fifty and eighty per cent. and of pectin between two-tenths of one per cent. and ten per cent.

In testimony whereof I have signed my name to this specification, in the presence of two subscribing witnesses.

MAXWELL O. JOHNSON.

Witnesses:
JAMES WAKEFIELD,
ADAM Y. ORNELLES.